United States Patent [19]
McNichol, Jr. et al.

[11] 3,873,127
[45] Mar. 25, 1975

[54] MULTI-PURPOSE BICYCLE RACK

[75] Inventors: Murray C. McNichol, Jr.; Raymond Keith Griggs, both of Bartlesville, Okla.

[73] Assignee: Kain's Research and Development Company, Inc., Bartlesville, Okla.

[22] Filed: Oct. 1, 1973

[21] Appl. No.: 402,009

[52] U.S. Cl. ............................. 280/202, 297/243
[51] Int. Cl. .......................................... B62j 7/04
[58] Field of Search...... 297/DIG. 9, 243; 224/32 R, 224/33, 37, 39 R, 40, 31; 280/202, 289

[56] References Cited
UNITED STATES PATENTS

| | | | |
|---|---|---|---|
| 1,102,899 | 7/1914 | Fox | 297/DIG. 9 |
| 1,121,580 | 12/1914 | Burkett et al. | 224/31 |
| 1,122,040 | 12/1914 | Springsteen et al. | 297/DIG. 9 |
| 1,139,715 | 5/1915 | Pawsat | 224/31 |

FOREIGN PATENTS OR APPLICATIONS

| | | | |
|---|---|---|---|
| 74,014 | 4/1952 | Denmark | 224/31 |
| 72,024 | 1/1951 | Denmark | 224/31 |
| 227,574 | 3/1958 | Australia | 224/31 |

*Primary Examiner*—Stanley H. Tollberg
*Assistant Examiner*—Norman L. Stack, Jr.

[57] ABSTRACT

A multi-purpose rack for bicycles which is designed for mounting directly behind the bicycle seat and over the rear wheel. The rack may be fully extended in a horizontal position for providing an enlarged space for carrying books, lunch pails, brief cases and the like. The rearward portion of the rack may be raised to a substantially vertical position and latched in place to form a rear buddy seat or the rack may be fully extended in a substantially upright position for securing thereto and carrying an ordinary back pack commonly used for hiking and the like.

4 Claims, 6 Drawing Figures

MULTI-PURPOSE BICYCLE RACK

BACKGROUND OF THE INVENTION

1. Field of the Invention

The present invention relates to a bicycle package or luggage rack and more particularly, but not by way of limitation to a rear mounted multi-purpose rack to serve as a luggage or package rack, a rear buddy seat, a back pack carrier, a bag carrier and bicycle rider back rest.

2. Description of the Prior Art

The recent renewed interest in bicycle riding as a form of exercise and transportation as well as the present interest in backpacking into the wilderness have given rise to a need for bicycle accessories for serving several useful purposes.

Day to day use of the bicycle by students and workers require the facilities for carrying books, lunch boxes and brief cases which can be met by the use of an ordinary luggage rack. However, many bicycle riders enjoy giving rides to little children during leisure hours which requires that the luggage rack be removed and a buddy seat installed in its place which is time consuming and troublesome. Further, if the bicycle rider desires to make a week-end tour he must pack his gear into a backpack and since most racks are not specifically constructed for handling backpacks, the rider usually straps the backpack onto himself and rides while carrying the pack which can be extremely tiresome during long trips. The carrying of the pack on the rider's back often results in back strain due to the bike riding position being different from the walking position for which the backpack was designed.

SUMMARY OF THE PRESENT INVENTION

The present invention provides a novel multi-purpose bicycle rack which is particularly designed and constructed for providing one rack which may be used to perform all of the above functions. The multi-purpose rack comprises a horizontally disposed rack base secured to the bicycle behind the seat and over the rear wheel. A jointed elongated rack member is pivotally secured to the rack base and may be fully horizontally extended to form an oversized luggage or package rack. The rear portion of this rack member may be raised and locked into position to form a rear buddy seat with accessories for strapping a small child thereon.

The rack may also be fully extended in an upright position to serve as a mount for a backpack or a carry-all bag. This position also serves as a back rest for the rider which is especially helpful on long trips. It is also contemplated that the back pack, bags and padding material which may be utilized with the back rack may be of a fluorescent or reflective material which is easily spotted by motorists.

DESCRIPTION OF THE DRAWINGS

Other and further advantageous features of the present invention will hereinafter more fully appear in connection with a detailed description of the drawings in which.

DETAILED DESCRIPTION OF THE PREFERRED EMBODIMENT

Figure 1:
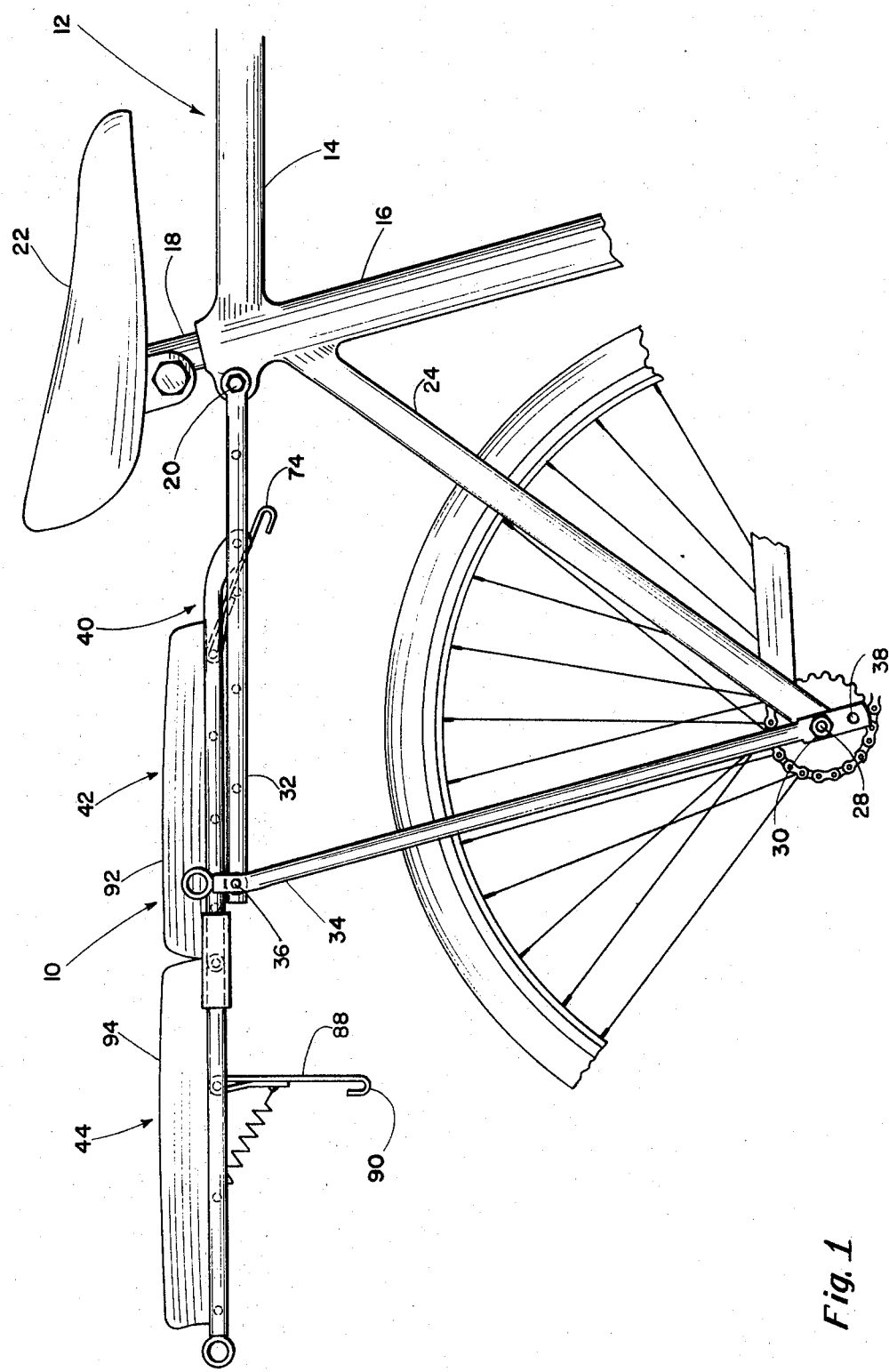
FIG. 1 is a side elevational view of a multi-purpose rack mounted on a bicycle in the fully extended horizontal position and embodying the present invention.

Referring to the drawings in detail, reference character 10 generally indicates a multi-purpose bicycle rack which is secured to the rear portion of a bicycle 12. Reference character 12 generally indicates the rear portion of a typical bicycle having a cross bar 14 which is connected at one end thereof to the front steering post (not shown) the rear portion thereof being connected to a substantially vertically disposed frame member 16. The upper end of the frame member 16 is designed to slidingly receive a bicycle seat bar 18 and is provided with a traversely extending bolt and nut member 20 to allow adjustability of the height of a seat member 22 which is secured to the top of the bar 18. The rear wheel fork member 24 consisting of two oppositely disposed members is secured near the upper end of the frame member 16 and extends rearwardly and downwardly on either side of the wheel 26 and is secured at the lower rear end thereof to the wheel axle 28 by means of suitable nuts 30.

The multi-purpose rack 10 generally comprises a horizontally disposed rack base 32 having the front end thereof connected to the bicycle seat adjustment bolt and nut 20. A pair of elongated rear support bars 34 and 35 are pivotally connected to the upper end thereof to the rear end of the rack base 32 at the transverse axis point 36 and the lower end thereof is provided with a plurality of bores 38 for receiving the rear wheel axle 28 therethrough, the said rack being tightened and held into place by means of the rear axle nuts 30.

An elongated jointed rack member generally indicated by reference character 40 is pivotally secured at one end thereof to the rack base 32 at a point directly behind the bicycle seat 22. The jointed rack member 40 generally comprises a first rack section 42 which is pivotally secured to the said rack base 32 and a second rack section 44 which is pivotally secured to the free end of the rack section 42.

The rack base 32 comprises a pair of spaced side bars 46 and 48 which are basically held together by a plurality of cross bars 50. The front ends of the side bars 46 and 48 are turned inwardly and are provided with a pair of aligned bores 52 and 54 for receiving the bicycle seat adjustment bolt and nuts 20 therethrough. The rear ends of the bars 46 and 48 are provided with a traversely extending hollow tube member 56 for receiving an elongated axle member 58 therethrough. The axle member 58 extends completely through the tube member 56 and the parallel bars 46 and 48 for pivotally securing the rack support members 34 and 35 thereon, at the point 36 hereinbefore described. The front portion of the side bars 46 and 48 are provided with a traversely extending latch bar 60 secured therebetween for purposes hereinafter set forth.

Figure 5:
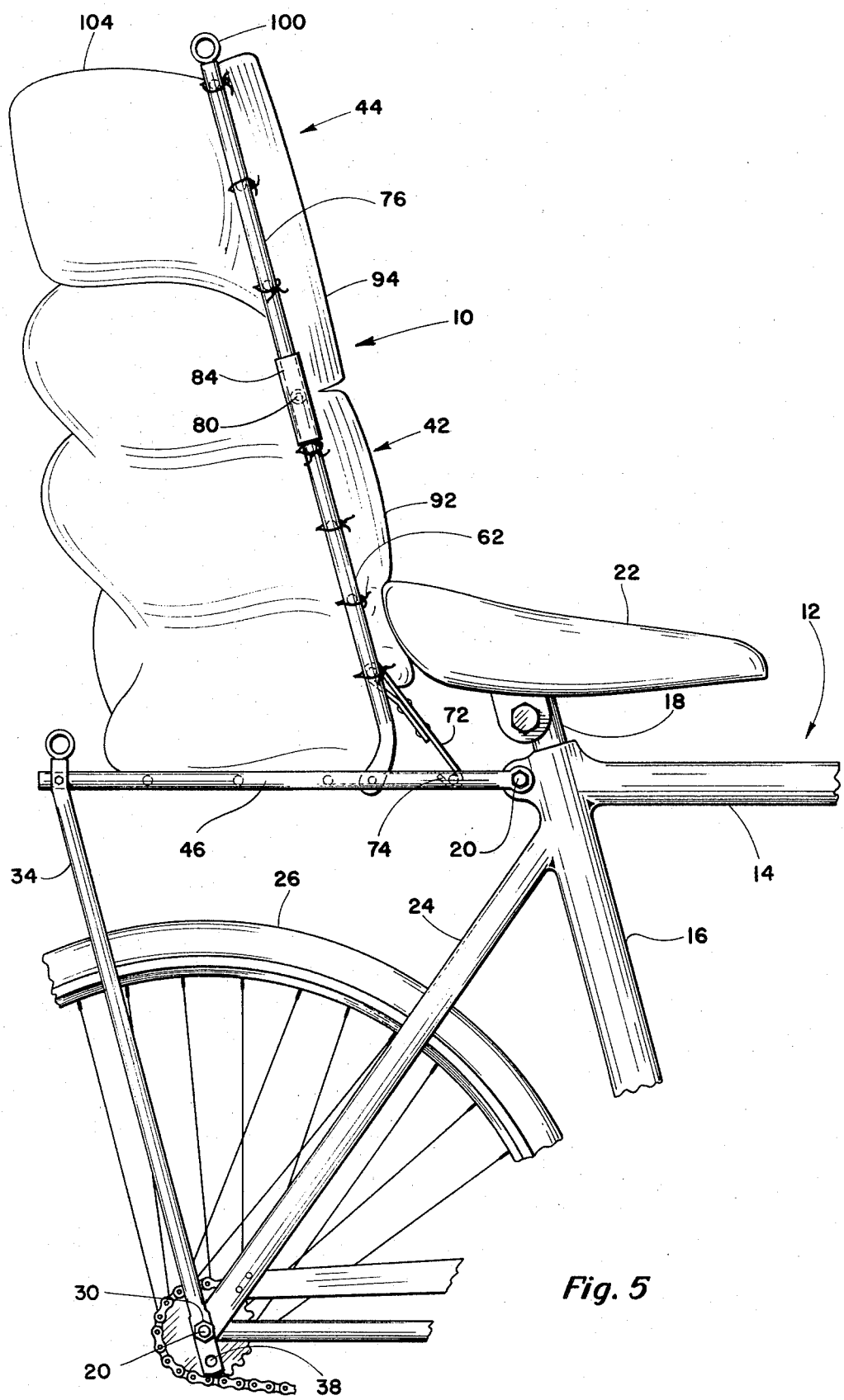
FIG. 5 is a side elevational view of the rack of FIG. 1 with the rack being fully extended in an upright position.

The first rack section 42 comprises a pair of spaced parallel tube members 62 and 64 which are held in spaced apart relationship by means of a plurality of cross bars 66. The front end of the tube members 62 and 64 are pivotally secured to the rack base side bars 46 and 48 respectively by means of pivot pins 68 and 70. The forwardmost cross member 66 is provided with a pivotally mounted elongated latch member 72. The opposite end of the latch member 72 is provided with a U-shaped bend 74 constituting a traversley disposed hook member whereby when the jointed rack member 40 is raised to the upright position as shown in FIG. 5, the hook member 74 may be secured around the latch bar 60 of the rack base 32 thereby holding the said jointed rack member 40 in an upright position. To disconnect the latch member 72 the jointed rack 40 is moved forwardly allowing the latch member 72 to be disconnected from the cross member 66. This allows the entire jointed rack member to be moved back to the horizontal position.

The second rack section 44 comprises a spaced pair of parallel tube members 76 and 78 having a plurality of spaced apart cross members 80 secured therebetween, the forward end of the tube members 76 and 78 are pivotally secured to the rear end of the first rack section tube members 62 and 64 about the pivot ends 80 and 82, respectively. The forward end sections of the tube members 76 and 78 are each provided with a slidable sleeve member 84 and 86, respectively. The sleeve members 84 and 86 when in the retracted position are moved away from the pivot pins 80 and 82. However, when it is desired that the first and second rack sections 42 and 44 be fully extended into an aligned disposition with respect to each other the sleeves 84 and 86 may be slid down and over the pivot pins 80 and 82 thereby locking the first and second rack sections 42 and 44 into a fully extended and aligned configuration as shown in FIGS. 1 and 5.

Figure 2:
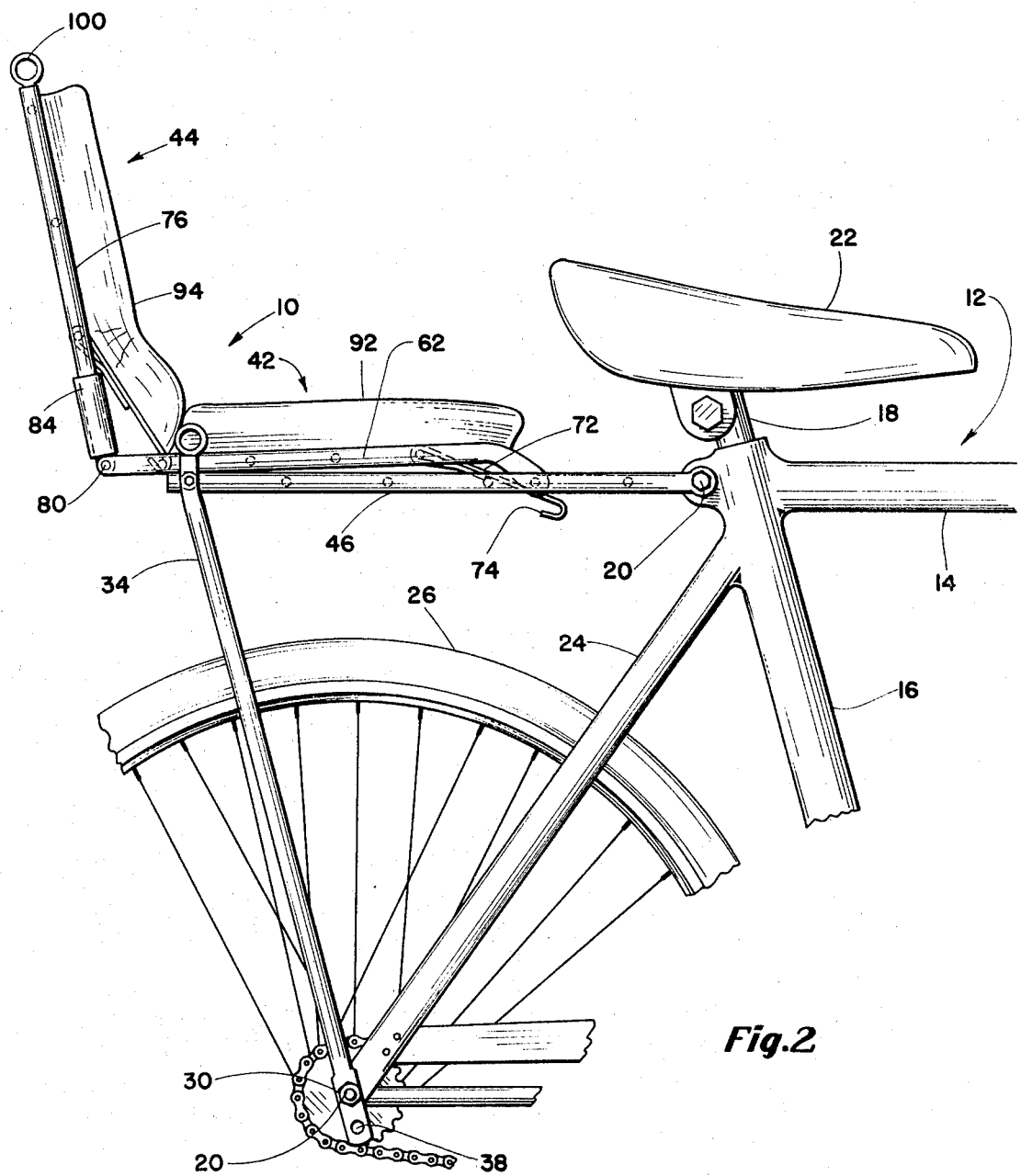
FIG. 2 is a side elevational view of the rack of FIG. 1 with the rear portion thereof being raised to form a rear buddy seat.
Figure 3:
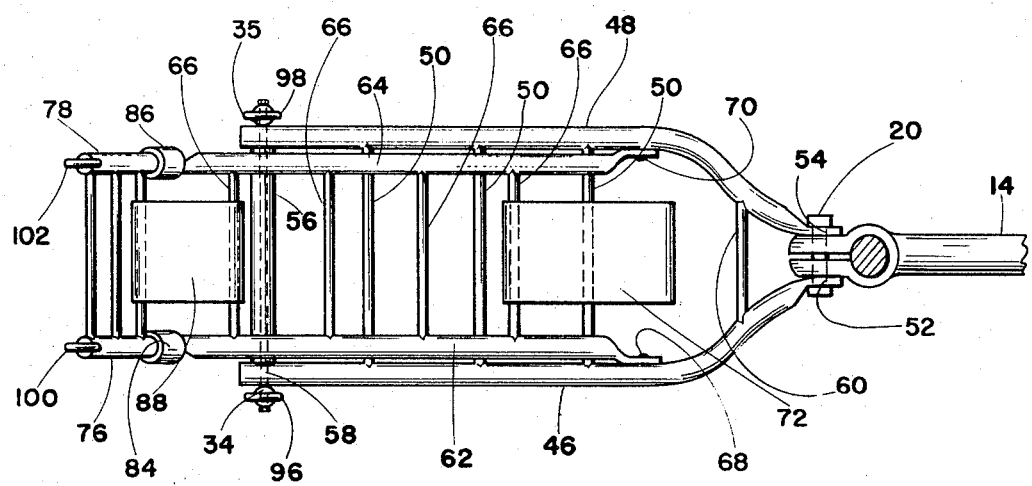
FIG. 3 is a top plan view of the rack of FIG. 2 with the cushion member and bicycle seat removed.
Figure 4:
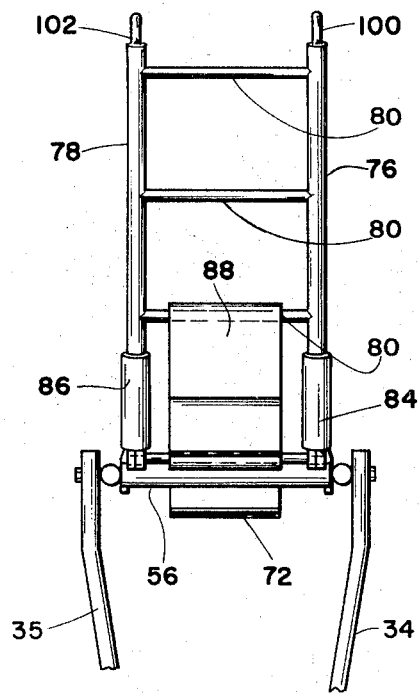
FIG. 4 is a rear elevational view of the rack configuration of FIG. 2.
Figure 6:
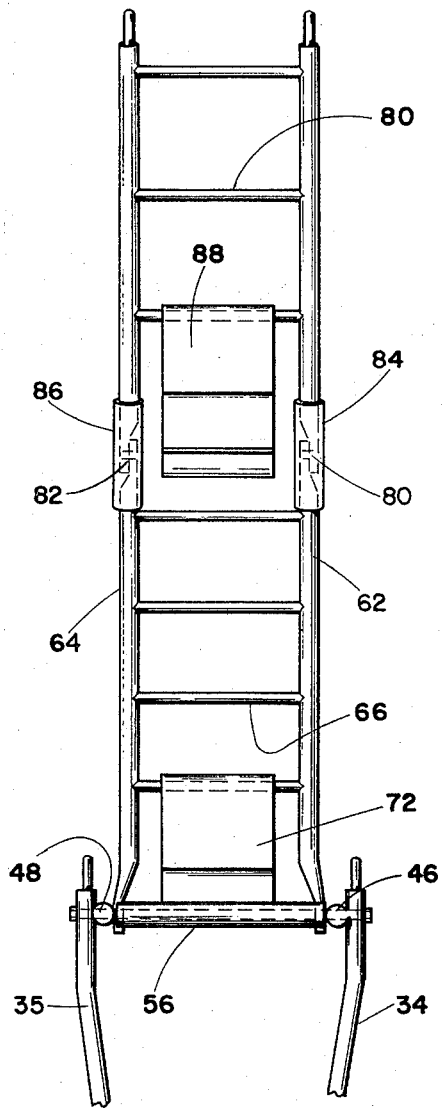
FIG. 6 is a rear elevational view of the rack configuration of FIG. 5.

A second elongated latch plate 88 which is similar to the latch plate 72 is pivotally secured at one end thereof to the forwardmost cross member 80 of the rear rack section 44. The opposite end of the latch plate 88 is provided with a traversely extended hook member 90 whereby when the second rack section 44 is raised to an upright position with respect to the first rack section 42, the hook member 90 of the latch plate 88 may be secured around the rearmost cross member 66 of the first rack section 42 as shown in FIG. 2. To disengage the latch plate 88 the second rack section 44 is simply tilted forward and the latch member 88 removed from engagement with the rearmost cross member 66 of the first rack section 42.

The first and second rack sections 42 and 44 may be provided with cushion members 92 and 94 respectively which may constitute one complete cushion having a joint adjacent to the pivot pins 80 and 82 therebetween. Further, to facilitate the strapping on of packages and the like to the bicycle rack in its various positions, attachment rings 96 and 98 are secured to the upper ends of the support bars 34 and 35, respectively. Also, similar support ring 100 and 102 are secured to the outer ends of the tubes 76 and 78 of the second rack section 44.

In operation, when it is desired to utilize the multipurpose rack 10 as a package or luggage carrier, the second rack section 44 is aligned with the first rack section 42 and the locking sleeve members 84 and 86 are slid into place over the pivot pins 80 and 82. The jointed rack section 40 is then placed in a fully extended horizontal position as shown in FIG. 1 and is rested on the rack base 32. Packages, books, briefcases and the like may be secured to the rack member 40 by use of the attachment rings 96, 98, 100 and 102. Naturally, attachment bungee cords and the like (not shown) may be strapped across substantially any portion of the rack by attaching the said cords to the rack strut members.

In order to position the multipurpose rack 10 for the attachment of the backpack or carry-all bag thereto the entire jointed rack 40 is raised to its upright position as shown in FIG. 5 and the hook 74 of the latching plate 72 is secured to the latching bar 60 of the rack base 32. Again the sleeve members 84 and 86 are slid into position over the pivot pins 80 and 82 thereby fully extending the jointed rack section 40 into its elongated configuration. The backpack 104 may then be positioned behind the jointed rack member 40 with the bottom end thereof resting upon the rack base 32. The said backpack 104 may then be secured in place by the use of the bungee cords or suitable tie strings.

It is also noted that in the position heretofore described and shown in FIG. 5 the top and lowermost surface of the jointed rack section 40 being provided with pad members 92 and 94 serves as a back rest for the bicycle rider.

When it is desired to convert the multipurpose rack 10 into a buddy seat as depicted in FIG. 2, the first rack section 42 is disposed in a horizontal position and the second section 44 is pivoted to an upright position and is locked into place by securing the hook member 90 of the latch plate 88 around the rearmost cross bar 66 of the first rack section 42. At this position a child or passenger being carried on the buddy seat may be strapped into place by means of bungee cords or the like to the attachment rings 96 and 98 and shoulder straps may be attached by use of the attachment rings 100 and 102.

From the foregoing it is apparent that the present invention provides a novel multipurpose back rack which may be utilized as a package or luggage carrier, a rear buddy seat, a backpack or carry-all bag rack and a back rest for the bicycle rider.

Whereas the present invention has been described in particular relation to the drawings attached hereto, other and further modifications apart from those shown or suggested herein may be made within the spirit and scope of this invention. It is noted that this novel multipurpose bicycle rack has been described in relation to the attachment of a typical bicycle. A rack within the scope of this invention could be adapted for use on motorcycles or other such vehicles.

What is claimed is:

1. A multi-purpose rack for bicycles comprising a horizontally disposed rack base, means for securing said rack base to the bicycle over the rear wheel thereof behind the bicycle seat, rack section comprising a first rack section pivotally secured to the rack base directly behind the bicycle seat, and latching means connectable between the rack base and said first rack section, and a second rack section pivotally secured to the free end of said first rack section, whereby said second rack section may be disposed in alignment with the first rack section or may be pivotally moved to a substantially right angle with respect thereto, first locking means for locking said second section in substantial alignment with the first section, and second locking means for locking said second section at an angle with respect to the first section to form a rear seat when said first section is disposed in a horizontal position.

2. A multipurpose rack for bicycles as set forth in claim 1 wherein the latching means comprises an elongated latch plate having one end thereof pivotally secured to the rack section, the opposite end thereof having a hook thereon and wherein the rack base is provided with at least one cross bar for positively engaging said hook when the rack is in upright position.

3. A multipurpose rack for bicycles as set forth in claim 1 wherein the rack section is provided with padding on one surface thereof.

4. A multipurpose rack for bicycles as set forth in claim 1 wherein the multipurpose rack is provided with a plurality of attachment rings.

* * * * *